US010931741B1

(12) United States Patent
Liguori et al.

(10) Patent No.: US 10,931,741 B1
(45) Date of Patent: Feb. 23, 2021

(54) USAGE-SENSITIVE COMPUTING INSTANCE MANAGEMENT

(71) Applicant: Amazon Technologies, Inc., Seattle, WA (US)

(72) Inventors: Clare Emma Liguori, Bainbridge Island, WA (US); Devin Singh Sandhu, Seattle, WA (US); Adithya Venkatesh, Seattle, WA (US); Bangxi Yu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 375 days.

(21) Appl. No.: 15/406,025

(22) Filed: Jan. 13, 2017

(51) Int. Cl.
*G06F 15/173* (2006.01)
*H04L 29/08* (2006.01)

(52) U.S. Cl.
CPC ........ *H04L 67/1002* (2013.01); *H04L 67/148* (2013.01); *H04L 67/16* (2013.01)

(58) Field of Classification Search
CPC ............................................ G06F 2009/45562
See application file for complete search history.

(56) References Cited

U.S. PATENT DOCUMENTS

| | | | | |
|---|---|---|---|---|
| 8,141,075 B1* | 3/2012 | Chawla | ............... | G06F 9/45558 718/1 |
| 9,841,988 B1* | 12/2017 | Magnezi | ............. | G06F 9/45558 |
| 9,929,931 B2* | 3/2018 | Breitgand | ........... | G06F 9/45558 |
| 10,275,270 B2* | 4/2019 | Singh | ................... | G06F 9/45558 |
| 2007/0233698 A1* | 10/2007 | Sundar | ...................... | G06F 8/60 |
| 2008/0235361 A1* | 9/2008 | Crosbie | ................. | G06F 9/5027 709/223 |
| 2010/0070978 A1* | 3/2010 | Chawla | ................. | G06F 9/5077 718/105 |
| 2012/0233668 A1* | 9/2012 | Leafe | ................... | G06F 9/45558 726/4 |
| 2013/0097601 A1* | 4/2013 | Podvratnik | ........... | G06F 9/5027 718/1 |
| 2014/0366018 A1* | 12/2014 | Spradlin | ............. | G06F 9/45533 718/1 |
| 2015/0106520 A1* | 4/2015 | Breitgand | ........... | G06F 9/45558 709/226 |
| 2015/0277952 A1* | 10/2015 | Lin | ..................... | G06F 9/45558 711/114 |
| 2015/0378765 A1* | 12/2015 | Singh | .................. | G06F 9/45558 718/1 |
| 2016/0055016 A1* | 2/2016 | Beveridge | ........... | G06F 9/45558 718/1 |
| 2016/0087992 A1* | 3/2016 | Ringdahl | .................. | G06F 8/63 726/7 |
| 2016/0098285 A1* | 4/2016 | Davis | .................. | G06F 9/45545 718/1 |
| 2016/0378519 A1* | 12/2016 | Gaurav | ................. | G06F 9/5077 718/1 |
| 2017/0351538 A1* | 12/2017 | Beveridge | ........... | G06F 9/45558 |
| 2017/0371568 A1* | 12/2017 | Aravot | ............... | G06F 9/45558 |

* cited by examiner

*Primary Examiner* — Umar Cheema
*Assistant Examiner* — Tesfu N Mekonen
(74) *Attorney, Agent, or Firm* — Davis Wright Tremaine LLP

(57) ABSTRACT

A resource service provider implements pool-based computing resource management. Computing instances are held in "pools" based at least in part on the requested task, the identity of the requestor, and/or the external requirements of performing the requested tasks.

20 Claims, 8 Drawing Sheets

USAGE-SENSITIVE COMPUTING INSTANCE MANAGEMENT

BACKGROUND

Computing resource providers leverage large-scale networks of servers and storage devices to enable their customers to execute a variety of applications and web services. This remote, distributed computing model allows the customers to efficiently and adaptively satisfy their computing needs without having to host and maintain the computing infrastructure themselves.

Many customers choose to execute some homegrown and/or third party application services in addition to or as an alternative to services provided by the computing resource service provider. Such application services are provided to and/or by the computing resource service provider in the form of application containers or modular formats. However, as there may be a practically infinite number of available third party application services, adding such services to existing computing resource service provider-provided services may incur significant latency and throughput penalties if the computing resource service provider has not preemptively optimized for the requested service. Additionally, the provider may have difficulty accommodating unanticipated load and traffic spikes without manual intervention or expending significant developer resources to design complex custom-built software applications to handle unexpected events.

BRIEF DESCRIPTION OF THE DRAWINGS

Various techniques will be described with reference to the drawings, in which.

DETAILED DESCRIPTION

Figure 1:
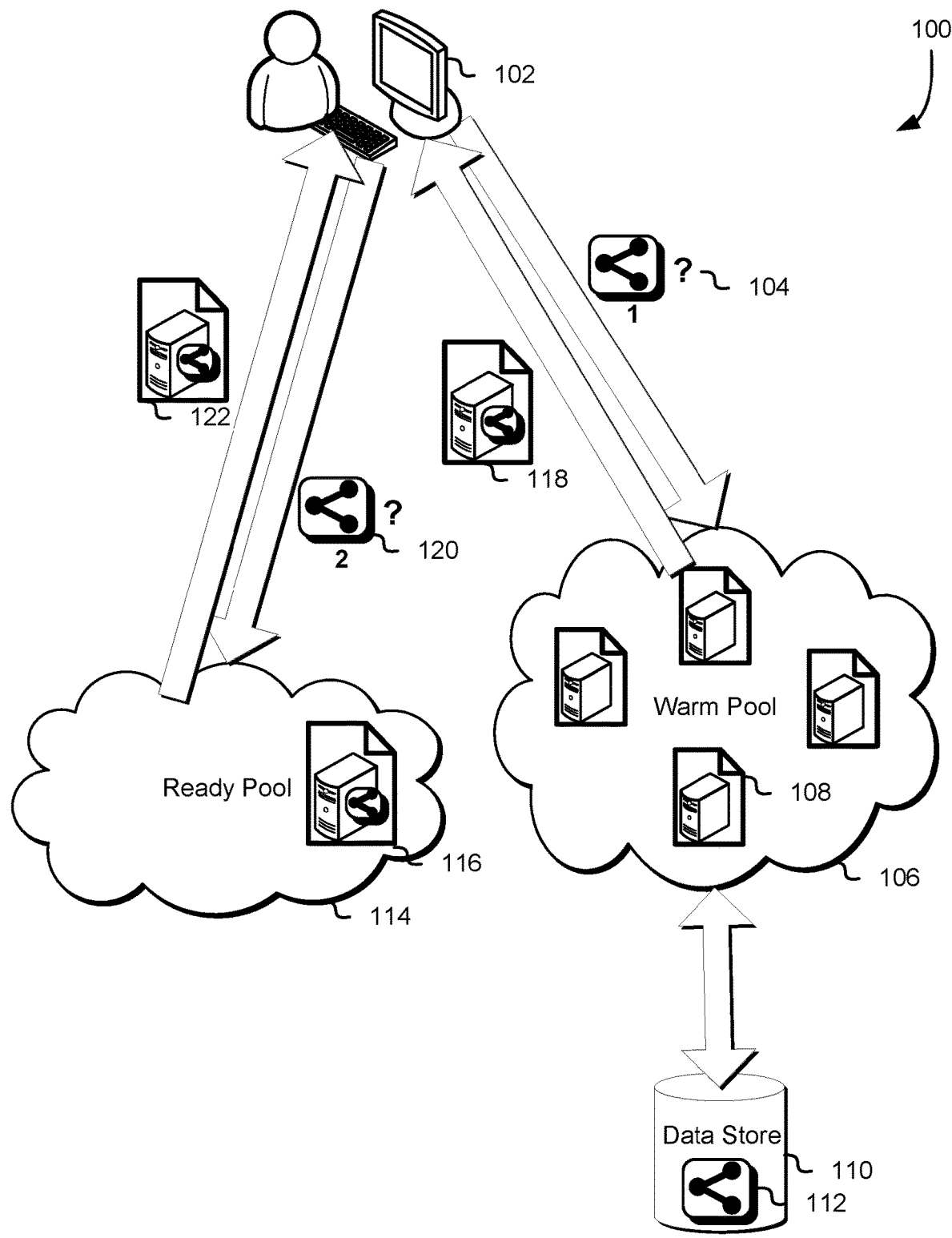
FIG. 1 illustrates an example of a requestor interacting with a warm pool and a ready pool for fulfillment of computing tasks, in accordance with one embodiment.

In one embodiment, a computing resource service provider provides pool-based staging for computing resources, such as computing instances, according to policies, usage patterns, computing task types, and the like. Requestors, such as customer devices (also referred to as customers, clients, or client devices herein) request the provision of one or more computing instances, such as virtual machines, to perform one or more computing tasks using those computing instances. Depending on the nature of the computing task(s) requested, parameters defined by the requestor (e.g., in the request, or in some other request), availability and/or integration into the computing instances of applications or other data for performing the requested task(s), relative geographical or network location of the requestor, availability and/or state of an applicable computing instance for performing the task, and/or other considerations, the computing resource service provider may use an instance cached in a first pool, attach any data or application for performing the requested task to the instance, perform the requested task, and place the instance (in a "suspended" or running state) into a second pool for efficient reuse by the requestor for further executions of the same task (or, in some cases, other tasks that instance is capable of performing).

In one embodiment, the computing resource service provider maintains a "warm pool" of computing instances and a "ready pool" of computing instances. The respective pools are implemented using one or more resources of the computing resource service provider, and refer to logical groupings of running instances which are maintained by an administrative or other privileged account of the associated resources until assigned to a requestor. Thus, in one embodiment, one or more management services associated with the computing resource service provider, such as a scaling service or resource service as described in further detail herein, track the boundaries of the respective pools.

In one embodiment, the warm pool holds one or more running computing instances based on a base image that includes applications, operating systems, and other data for performing one or more computing tasks on those computing instances. The instances in the warm pool are available on request to any requestor authorized to operate the instances, and are not specific to any particular requestor. As may be contemplated, running instances use more underlying resources than those which are fully "frozen," e.g., shut down and committed back to a disk image, and as such, a component of the system, such as a scaling service makes determinations (e.g., based on input from a telemetry service) of the boundaries of the warm pool. In one embodiment, such determinations are based on historical usage data, such as request rates, resource usage, execution times for tasks, and the like, for instances made available to requestors. In one embodiment, the component determines the previous level of use of each of a plurality of types of instances (e.g., "small," "medium," and "large," corresponding to a respective amount of computing resources of the computing resource service provider allocated to the respective instance), as well as patterns over time of the usages thereof, and predicts when and of what type the running instances held in the warm pool should be.

In one embodiment, the ready pool holds, for a specific requestor, one or more running computing instances having been used by the requestor to perform a computing task. In some cases, the computing task relies on a data set, such as a database, application (e.g., executable code for an application), or other data, that is not part of the base image or the instances spawned from the base image (e.g., the instances populating the warm pool). A requestor may submit, in connection with a request to perform the computing task, an application container, such as a Docker container, to an application programming interface service of the computing resource service provider for attachment to the requested instance. In one embodiment, applications or other data (e.g., in data containers) may be made available by the computing resource service provider to the requestor, such as via an API or user interface, for selection, where the data is not part of the base image and/or the warm pool instances. In such cases, the data may be available on a different service or system of the computing resource service provider than that of the implementing resource service. This data is added to a running instance from the warm pool, and the computing task is executed. After completion of the computing task, the instance (now containing the extrinsic data related to performing the computing task) is attached to the ready pool and reserved for further requests by the originating requestor to perform the same computing task (or other task performable by the instance), if the ready pool addition is within the prespecified bounds of the ready pool.

A requestor, in one embodiment, specifies to the scaling service one or more parameters related to the boundaries of the ready pool. These parameters may be specified as part of a request to instantiate the instance (e.g., as part of the request to perform the requested computing task). In one embodiment, the parameters are specified separately from such a request, such as in a different request. The parameters may be received as an update to, e.g., a policy related to the boundaries of the ready pool directly, or that of the requests to perform the requested computing task. In one embodiment, the requestor requests performance of a computing task and specify that the task not be repeated after completion. As a result, the instance used to execute the task is not added to the ready pool. However, if no such restriction is specified, the instance is added to the ready pool and made available for the requestor for a period time. As may be contemplated, the higher level behavior of the ready pool can be defined by one or more policies of the distributed computing system (e.g., default additions or exclusions to the ready pool).

In one embodiment, the boundaries of the ready pool as well as that of the warm pool span multiple logical zones, such as geographical zones, network zones, availability zones, datacenters, etc., so as to improve availability of the respective pools and decrease access latency, relative to the originating node(s), of the requestors to the running instances contained within. As mentioned, the parameters defining the ready pool may specify inclusions and/or exclusions for such zones. In one embodiment, a requestor specifies the exclusion or inclusion of one or more available logical zones as being eligible for ready pool addition. In this embodiment, if an instance used to perform a given computing task is sourced from a specific logical zone (e.g., from the warm pool in that zone), that instance may be added to the ready pool in the same zone, so long as the zone is not excluded by policy and no other restriction to its addition exists.

In one embodiment, the computing resource service provider sets various administrative parameters related to the operation of the pools. In one embodiment, requests to perform computing tasks are set according to affinities for specific pools, logical zones, and the like. The affinity calculations may be influenced by one or more parameters, such as system load (overall or in a given logical zone), matching of requested tasks to available instances, geographical, network, or other measure of proximity to the requestor, pool type, instance type, and the like. If the warm pool and the ready pool for a requestor are both are capable of executing a requested task on behalf of the requestor, the system may prefer to use an instance within the ready pool to execute the task. If no matching instances in the ready pool exist, the system falls back to the warm pool, and furthermore attempts to prioritize logical zones with the lowest latency relative to the requestor. Alternatively, the system may prioritize logical zones with lower overall system load, and provide instances from those zones, rather than other, higher demand zones, even if such zones nearer in proximity (whether on the network or geographically).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example of a requestor interacting with a warm pool and a ready pool for fulfillment of computing tasks, in accordance with one embodiment.

A requestor 102, such as customer devices (also referred to as customers, clients, or client devices herein) requests the provision of one or more computing instances, such as virtual machines, to perform one or more computing tasks using those computing instances. In one embodiment, the requestor 102 submits a first request 104 to perform a computing task. Computing tasks are tasks involving computation, processing, and/or storage of data, and include execution of an application, performing database maintenance or queries, operation of a virtual machine, archival of data, and the like.

Depending on the nature of the computing task(s) requested, parameters defined by the requestor (e.g., in the request, or in some other request), availability and/or integration into the computing instances of applications or other data for performing the requested task(s), relative geographical or network location of the requestor, availability and/or state of an applicable computing instance for performing the task, and/or other considerations, the computing resource service provider may initially use an instance 108 cached in a warm pool 106 to perform the task, if an instance capable of performing the computing task is available in the warm pool 106. In one embodiment, the instance 108 is held in a running state (or, in some cases, suspended state) in the warm pool 106 so as to quickly be available, thereby avoiding delays incurred when instantiating an instance from an image, e.g., on disk. However, in certain cases, such as if a suitable instance for executing the task is not available in the warm pool 210, a "cold" instance is spun up from, e.g., an image on storage.

The warm pool 106 is, in one embodiment, implemented using one or more resources of the computing resource service provider, such as a scaling service or resource service as described in further detail herein. In one embodiment, as mentioned, the warm pool 106 is a logical grouping of running instances which are maintained by an administrative or other privileged account of the associated resources until assigned to a requestor. Thus, in one embodiment, one or more management services or other components associated with the computing resource service provider, such as a scaling service or resource service as described in further detail herein, track the boundaries of the respective pools. Note that in an embodiment, the computing resource service provider implements a plurality of warm pools 106, such as by instance type, geographical locale, task type, or some other arbitrarily definable differentiation or logical boundary.

In one embodiment, the warm pool 106 is populated by, e.g., a resource service of the computing resource service provider, with one or more running computing instances 108 based on a base image that includes one or more of each of applications, operating systems, and/or other data for performing one or more computing tasks on those computing instances. The instances in the warm pool 106 are available on request to any requestor authorized to operate the instances, and are not specific to any particular requestor. As may be contemplated, running instances use more underlying resources than those which are fully "frozen," e.g., shut down and committed back to a disk image, and as such, a component of the system, such as a scaling service makes determinations (e.g., based on input from a telemetry service, also described in further detail below) of the boundaries of the warm pool 106.

In one embodiment, the determination of the type, quantity, lifetime, etc. of instances 108 for the warm pool 106 are based on historical usage data, such as request rates, resource usage, execution times for tasks, and the like, for instances made available to requestors. In one embodiment, the component (e.g., scaling service and/or telemetry service) determines the previous level of use of each of a plurality of types of instances (e.g., "small," "medium," and "large," corresponding to a respective amount of computing resources of the computing resource service provider allocated to the respective instance), as well as patterns over time of the usages thereof, and predicts when and of what type the running instances held in the warm pool 106 should be. The determination may also be adaptive, in the sense that heuristics used to predict the instance mix and quantity in the pool may be continuously adjusted based at least in part on whether and to what extent the actual observed usage (e.g., "hit rate") for instances 108 in the warm pool 106 matches the prediction.

In one embodiment, the warm pool 106 provides an instance 108 in response to the request to perform the computing task 104. The request 104, as previously mentioned, may involve additional data, applications, or the like, not immediately extant within the running instance (e.g., 108). The requestor submits, in connection with the request 104 to perform the computing task, an application container, such as a Docker container, to an application programming interface service (described in further detail herein) of the computing resource service provider for attachment to the requested instance. In one embodiment, applications or other data (e.g., in data containers) may be made available by the computing resource service provider to the requestor, such as via an API or user interface, for selection, where the data is not part of the base image and/or the warm pool instances. In such cases, the data may be available on a different service or system of the computing resource service provider than that of the implementing resource service. In one embodiment, the additional data 112 is available in the data store 110, which may be any service or resource of the computing resource service provider capable of storing, retrieving, and providing data (e.g., a storage service of the computing resource service provider). The data 112 is added to the instance selected for execution of the task, and the computing task is executed.

After execution of the task, in one embodiment, the ready pool 114 holds, exclusively for the requestor, one or more running computing instances having been used by the requestor to perform a computing task (e.g., the instance 118 after addition of the data 112 in connection with the computing task execution request 104). As mentioned, in some cases, the computing task relies on a data set, such as a database, application (e.g., executable code for an application), or other data, that is not part of the base image or the instances spawned from the base image (e.g., the instances populating the warm pool 106). After completion of the computing task, the instance 116 (now containing the extrinsic data related to performing the computing task) is attached to the ready pool 114 and reserved for further requests by the originating requestor to perform the same computing task (or other task performable by the instance), if the ready pool addition is within the prespecified bounds of the ready pool, as described in further detail elsewhere herein. Accordingly, when the requestor 102 makes a second request 120 to perform the same computing task, the implementing system can simply provide 122 the running instance 116 in the ready pool 114, which already has the extrinsic data 112, thereby further improving efficiency, latency, performance, and the like. Note that in an embodiment, the computing resource service provider implements a plurality of ready pools 114, such as by instance type, geographical locale, task type, or some other arbitrarily definable differentiation or logical boundary. In an embodiment, the requestor 102 defines multiple policies or other logical boundaries for its ready pool(s), and in some of such cases, the policies result in different ready pools having different logical boundaries for the same requestor.

Figure 2:
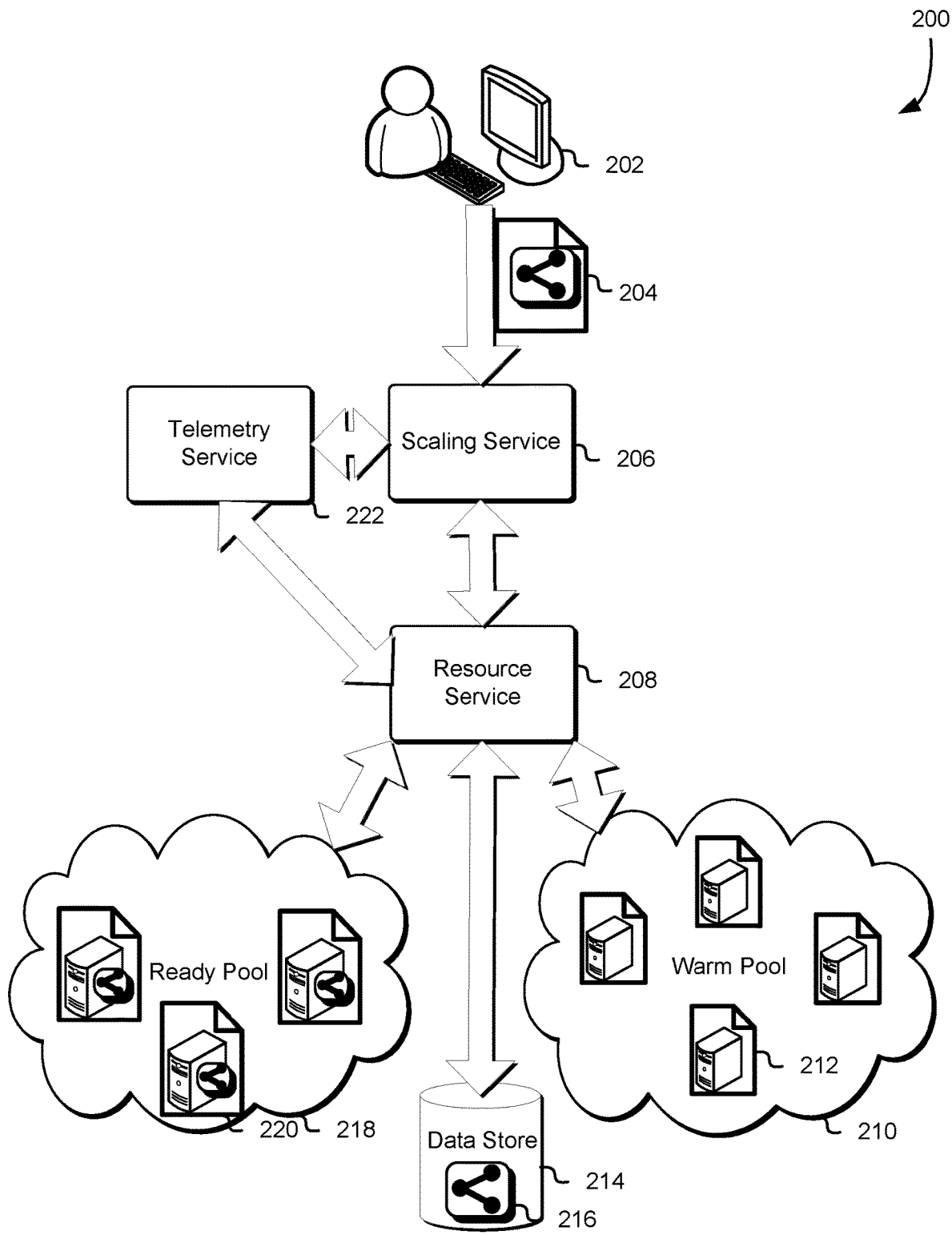
FIG. 2 illustrates an example of a system implementing a scaling service and a resource service to maintain a ready pool and a warm pool of computing resources, such as computing instances, on behalf of a requestor, in accordance with one embodiment.

FIG. 2 illustrates an example of a system implementing a scaling service and a resource service to maintain a ready pool and a warm pool of computing resources, such as computing instances, on behalf of a requestor, in accordance with one embodiment.

A requestor 202, in one embodiment, specifies to the scaling service 206 one or more parameters 204 related to the boundaries of the ready pool 218. These parameters may be specified as part of a request to instantiate the instance (e.g., as part of the request to perform the requested computing task). In one embodiment, the parameters are specified separately from such a request, such as in a different request. The parameters may be received as an update to, e.g., a policy related to the boundaries of the ready pool directly, or that of the requests to perform the requested computing task.

In one embodiment, the scaling service 206 is a service provided by the computing resource service provider that automatically and dynamically manages computing resources that might be subject to demand fluctuation. The scaling service 206 is, in one embodiment, responsible for determining, adjusting, adding to, maintaining, and evicting the resources in the respective warm and ready pools according to the incoming parameters just described, as well as feedback (e.g., alarm notifications) of the connected telemetry service, as further described herein. In one embodiment, the scaling service 206 may respond to alarms or other notifications from external applications, such as an alarm notification transmitted to the scaling service 206 by the telemetry service 222, to cause another service, such as the scalable resource service 208, to adjust and/or allocate resource capacity. The scaling service 206 may support scaling actions such as scaling up, scaling down, scaling in, and scaling out. The term "scale-out" may refer to the concept of replicating/creating additional resources (e.g., adding additional software containers) of the type being scaled. Likewise, the term "scale-in" may refer to the concept of reducing/terminating a number of resources (e.g., terminating container instances) of the type being scaled.

Similarly, the term "scale-up" may refer to increasing a magnitude of a resource (e.g., increasing the size of a storage volume, increasing the computing power (CPUs) for provisioned compute instances, etc.). As well, the term "scale-down" may refer to decreasing a magnitude of a resource (e.g., reducing a read throughput of a database service table).

In one embodiment, such as after receiving an alarm notification or other information from the telemetry service 222, the scaling service 206 retrieves a scaling policy that corresponds to the alarm. In the present disclosure, a scaling policy defines how to scale a scalable target (e.g., a scalable dimension of a resource of the scalable resource service 208, such as represented by the instances 212, 220 of the respective warm pool 210 and ready pool 218). In particular, the scaling policy provides the parameters required by the scaling service 206 to calculate the new capacity (i.e., scaling amount) for the scalable target. The scaling service 206 or some other service of the computing resource service provider may log each time the scaling service 206 outputs a new capacity for later reference by the customer-owner of the scalable target. This log may represent the scaling history of the scalable resource service 208. It must be noted that in some implementations the customer can issue a command directly to the scaling service 206 to execute the scaling policy. In one embodiment, the parameters 204 constitute such a direct command. In these cases, the telemetry service 222 would be bypassed. Likewise, in some implementations scaling policies may execute according to a predetermined schedule (e.g., according to a schedule specified by the customer). In these cases, the scaling service 206 may receive the alarm notification that causes the scaling policy to be executed from a scheduler service, from the customer, or from some service other than the telemetry service 222.

The scaling information specified by the scaling policy may refer to a new capacity calculation by the scaling service 206 in accordance with the scaling policy and the current capacity of the resource of scalable resource service 208. The new capacity reflects an estimate of what the capacity of the resource should be. Receipt of the new capacity by the scalable resource service 208 may cause the scalable resource service 208 to perform a scaling action. A scaling action may refer to an action taken to increase or decrease the desired capacity of a scalable target. It must be noted that outputting the scaling information may cause additional actions to be performed in addition to or alternative to adjusting a capacity of the scalable target. In one embodiment, a text message may be sent to an administrator of the scalable resource service 208. Moreover, if a current capacity of the scalable target already matches the new capacity, the scaling action may not be performed or performance may be deferred. The scaling information may be sent in a variety of formats, such as in a message encoded in JavaScript Object Notation (JSON) or some other format.

The scaling service 206 may further keep a record of scaling activity. In one embodiment, the scaling service 206 may log time a new scaling capacity is computed and/or each time an alarm notification is received. Additional information logged may include a transaction identifier (ID) associated with the scaling activity, a timestamp, etc. The record of scaling activity may further include whether or not the scalable resource service 208 successfully implemented the new capacity. Thus, in addition to the new capacity, the scaling information may include other information such as the transaction ID.

As mentioned, the computing resource service provider may provide one or more computing resource services to its customers individually or as a combination of services of a distributed computer system. The one or more computing resource services of the computing resource service provider may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

Customers of the computing resource service provider, such as requestor 202, may communicate with one or more of the services via an interface, which may be a web services interface or any other type of customer interface. Each service provided by the computing resource service provider may have its own interface, and subsets of the services may have corresponding individual interfaces in addition to, or as an alternative to, a common interface. A customer may communicate with the computing resource service provider through a network whereby the network may be a communication network, such as the Internet, an intranet, an internet service provider (ISP) network, and/or some other such network as described below.

The term "customer" may refer to a system or device, such as the requestor 202, of a customer entity (such as an individual, company, or other organization) that utilizes services provided by the computing resource service provider. In one embodiment, a system may be an individual computing device, a mainframe, a customer accessible virtual machine instance, or other system capable of communicating with one or more of the provided services.

In one embodiment, a "software container" (also referred to as a "container" for short) may be an isolated user space instance. That is, a software container may be a lightweight, virtualized instance running under a computer system instance that includes programs, data, and system libraries. A difference between a software container and a virtual machine is that, while the hypervisor of a virtual machine abstracts an entire hardware device, the software container engine may just abstract the operating system kernel. While software containers run in isolation from each other, they can share the same binaries and library files as needed. Consequently, the software container can be more efficient than a virtual machine in terms of resource usage. In an environment where a customer needs to run multiple copies of the same application, more applications can be run simultaneously in software containers than running the applications simultaneously in separate virtual machines using the same hardware. A "software container engine" may refer to underlying software that manages the software containers. Such container engines include the Docker container engine and the CoreOS Rocket container engine.

The customer may use a web user interface console or command line interface to register the software container to be added to running instances (such as those of the warm pool) with the scaling service 206 and, therefore, the instances to be used for execution thereof (e.g., instances 212).

In one embodiment, telemetry measurements are emitted from the scalable resource service 208 to the telemetry service 222. As a result of the telemetry measurements meeting and alarm condition specified by the customer or an administrator of the computing resource service provider, the telemetry service 222 sends an alarm notification. However, it is also contemplated that rather than being triggered by measurements, the alarm may be triggered by the occurrence of one or more specified events (also referred to as a "telemetry event"). Such events include detecting a message having been sent to a message queuing service or detecting that a certain function has been executed in a software container. Additionally or alternatively, in one embodiment, scaling policies can be triggered according to a predefined schedule.

The telemetry measurements may but need not necessarily be emitted from the scalable resource service 208. That is, the telemetry measurements may originate from another service or source separate from the scalable resource service 208, or even from a service external to the computing resource service provider. In one embodiment, the telemetry measurements are received by the telemetry service 222 from a separate data storage service utilized by the scalable resource service 208.

Likewise, the scope of the present disclosure should not be limited to embodiments having a telemetry service or analogue. That is, it is contemplated that the scaling policy of the scaling service 206 that triggers the scaling service 206 to output the scaling information may be directly triggered by some other entity, such as the customer (e.g., via a web service console, command line interface, etc.) or another application or service associated with the customer (e.g., a scheduling service, a load-balancing service, etc.).

In one embodiment, the telemetry service 222 is a service configured to aggregate control group measurements (e.g., information about the state of a scalable resource service 208) and container logs. Control group measurements include information such as the amount of memory used by processes running under the scalable resource service 208, number of times that a process running under the scalable resource service 208 triggered a page fault, central processing unit usage by processes running under the scalable resource service 208, time during which the central processing units were executing system calls on behalf of processes running under the scalable resource service 208, number of reads and writes to the scalable resource service 208, network traffic used by the scalable resource service 208 on behalf of the customer, and number of input/output operations queued for the scalable resource service 208. The telemetry service 222 may allow the customers to configure the telemetry service 222 to send an alarm notification, to another application or service (such as the scaling service 206) when certain control group metrics reach a value relative to a threshold.

In one embodiment, the alarm notification is a notification sent from the telemetry service to the scaling service upon fulfillment of criteria for triggering the alarm. That is, the customer may define parameters that trigger the alarm, which causes the alarm to be sent to the scaling service. In some cases, the alarm may be triggered based on metrics of a service different from the scalable resource service to be scaled. In one embodiment, a load that exceeds a threshold at another service triggers the alarm notification to be sent to the scaling service, and the scaling policy corresponding to the alarm notification may dictate that a resource of the scalable resource service should be scaled-out.

The requestor 202 may request performance of a computing task and specify that the task not be repeated after completion. As a result, the instance used to execute the task is not added to the ready pool 218. However, if no such restriction is specified, the instance 220 is added to the ready pool 218 and made available for the requestor 202 for a period of time. As previously noted, the requested task, in one embodiment, uses extrinsic data 216 available in a data store 214, which is added to the warm pool 212 (or other) instance as a result of task performance. In this case, the instance is added to the ready pool 218 so as to retain (e.g., include) such data (e.g., instance 220). As may be contemplated, the higher level behavior of the ready pool can be defined by one or more policies of the distributed computing system (e.g., default additions or exclusions to the ready pool) such as scaling policies, and the like. Furthermore, in one embodiment, the scaling up, down, in, and out of various resources, such as computing instances, within the respective warm and ready pools 210, 218 are performed using the various techniques, policy manipulations, alarm triggers, and resource adjustments just described (e.g., by the interaction between scaling service 206, resource service 208, and telemetry service 222).

Figure 3:
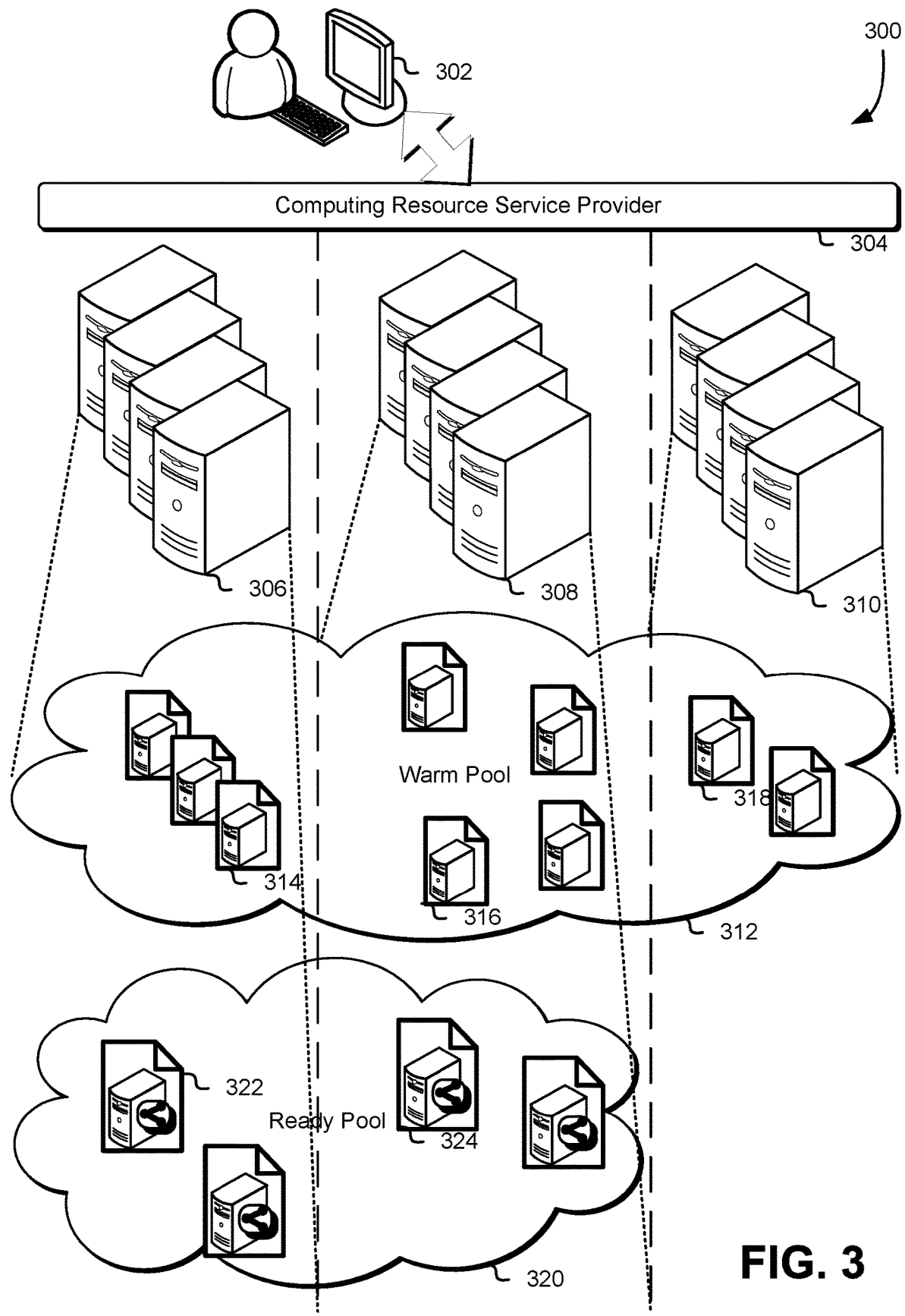
FIG. 3 illustrates an example of a computing resource service provider implementing a warm pool and a ready pool across multiple geographical or other logical availability zones, in accordance with one embodiment.

FIG. 3 illustrates an example of a computing resource service provider implementing a warm pool and a ready pool across multiple geographical or other logical availability zones, in accordance with one embodiment.

As mentioned, in one embodiment, the computing resource service provider 304 sets various administrative parameters related to the operation of the pools 312, 320. In one embodiment, requests to perform computing tasks are set according to affinities for specific pools, logical zones within the pools, and the like. The affinity calculations may be influenced by one or more parameters, such as system load (overall or in a given logical zone) of the computing resource service provider resources implementing the instances 314, 316, 322, 324, matching of requested tasks to available instances, geographical, network, or other measure of proximity to the requestor, pool type, instance type, and the like.

In one embodiment, if the warm pool 312 and the ready pool 320 for a requestor 302 are both are capable of executing a requested task on behalf of the requestor, the system may prefer to use an instance within the ready pool 320 to execute the task. If no matching instances in the ready pool 320 exist, the system falls back to the warm pool 312, and additionally attempts to prioritize logical zones with the lowest latency relative to the requestor. Alternatively, the system may prioritize logical zones with lower overall system load, and provide instances from those zones, rather than other, higher demand zones, even if such zones are nearer in proximity (whether on the network or geographically).

In one embodiment, the boundaries of the ready pool 320 as well as that of the warm pool 312 span multiple logical zones 306, 308, 310, such as geographical zones, network zones, availability zones, datacenters, etc., so as to improve availability of the respective pools 312, 320 and decrease access latency, relative to the originating node(s) (e.g., the requestor 302), of the requestors to the running instances contained within. As mentioned, the parameters defining the ready pool may specify inclusions and/or exclusions for such zones. In one embodiment, a requestor specifies the exclusion or inclusion of one or more available logical zones as being eligible for ready pool addition. In this embodiment, if an instance used to perform a given computing task is sourced from a specific logical zone (e.g., from the warm pool in that zone), that instance may be added to the ready pool in the same zone, so long as the zone is not excluded by policy and no other restriction to its addition exists.

In one embodiment, the requestor 302 requests an instance to perform a computing task without restriction on which zone 306, 308, 310 in which the instance runs. As a result, the computing resource service provider 304, e.g., chooses an instance according to its own optimization (e.g., balancing system load, etc.). However, if the requestor requests the performance of a computing task and specifies that it can only be run in one of zones 306 or 308 (and not in 310), the computing resource service provider 304 selects an instance from zones 306, 308. In this embodiment, if a matching instance can be found in such zones, one of the instances 314, 316 is selected, and the computing task is executed (e.g., with accompanying attachment of data sets, such as a container, to the instance, for commission of the task). After completion of the task, the running instance is attached to the ready pool 320 (e.g., 322 or 324, as illustrated). Note that the ready pool 320, as illustrated, does not extend into zone 310 in the illustrated embodiment, as a result of the zone restriction previously mentioned. However, to the extent that the same requestor requests performance of a computing task but specifies that the instance running the task should be destroyed after execution of the task (and, thus, not attached to the ready pool 320), the instances 318 are also available for selection from the warm pool 312.

Figure 4:
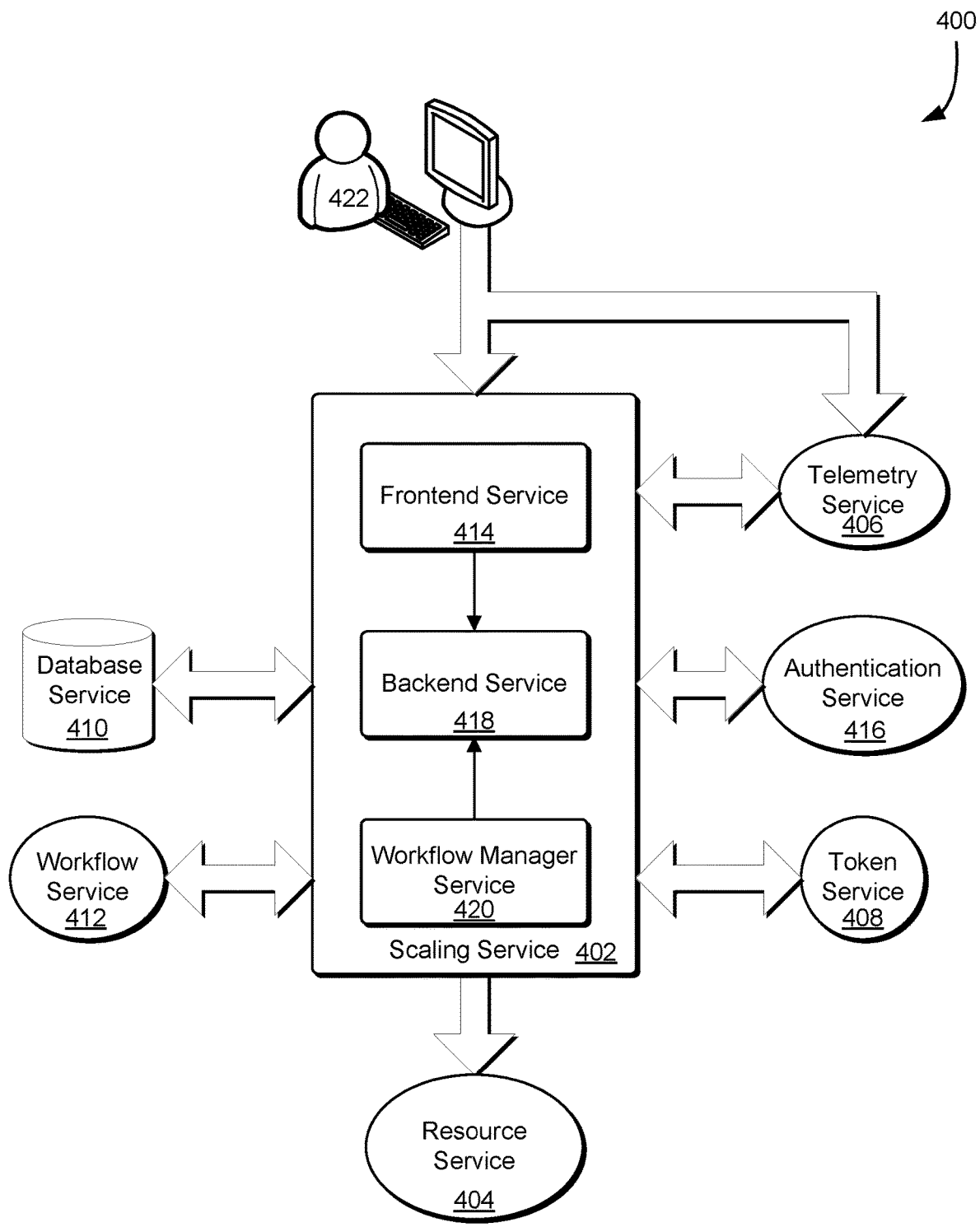
FIG. 4 illustrates an example of a computing resource service implementing various services for provision, instantiation, scaling, caching, and tracking of computing resources, such as computing instances, in accordance with one embodiment.

FIG. 4 illustrates an example of a computing resource service implementing various services for provision, instantiation, scaling, caching, and tracking of computing resources, such as computing instances, in accordance with one embodiment. As illustrated in FIG. 4, the environment 400 may include a scaling service 402 comprising a scaling service frontend 414, a scaling service backend 418, and a scaling service workflow manager 420. A customer 422 may set scaling policies via the scaling service frontend 414 and may also set alarm actions with a telemetry service 406 that trigger the scaling policies. Calls made to the scaling service frontend 414 may be authenticated by an authentication service 416. Scaling policies may be stored with the database service 410 by the scaling service backend 418, and scaling actions may be initiated through a scaling service workflow manager 420 by the scaling service backend 418. The customer 422 may specify, via a policy/role management service (not shown), a role to be assigned to the scaling service 402, and the scaling service 402 may obtain a token from a token service 408 as proof that the scaling service 402 has been granted that role. Upon triggering a scaling policy, the scaling service 402 may obtain a resource's current capacity and set the resource's capacity for its respective resource service of the resource services 404 under the specified role.

The scaling service frontend 414 may be the frontend for the scaling service 402. That is, the scaling service frontend 414 provides the customer 422 with a single endpoint. The customer 422 may use an interface console or call an API to instruct the scaling service 402 to create scaling policies for their resources. That is, the customer 422 may submit scaling service API requests to the scaling service frontend 414. The scaling service frontend 414 may pass the requests through to the scaling service backend 418. In one embodiment, the customer 422 may use a service interface (i.e., via the scaling service frontend 414) to register a scalable target, such as the resources in the pools previously described. The scalable target may refer to a dimension of the resource that the customer 422 may scale. In one embodiment, the scalable target may include a service ID or namespace, a resource ID, and/or a dimension name or identifier such that the scalable target uniquely identifies which dimension of the particular resource of the particular service to scale. Once the scalable target is registered, the customer 422 may create a scaling policy to be associated with the scalable target.

The scaling service backend 418 may be the backend data and/or control plane for the scaling service 402. The scaling service backend 418 may receive and process scaling requests (e.g., via a control plane) and create, read, update, and delete in response to corresponding API requests (e.g., via a data plane). For scaling requests, the scaling service backend 418 may calculate a new desired capacity and launch a scaling workflow via the workflow service 412, which in itself may interact with the target resource and use a control plane service to track and record the interaction. Storage of the policies, scaling activities, and identities of scalable targets may be stored with a database service 410, and then a workflow service 412 may be used to orchestrate the scaling workflow. The computing resource service provider may provide general APIs for managing the scaling of various resource service types so that the customer 422 need learn only one API to scale all their resources. In order for the scaling service 402 to determine which resource to scale, a resource must be uniquely identifiable and have one or more scalability measures (e.g., scalable dimensions) that may be independently increased or decreased. That is, the customer 422 must identify the resource they want to auto-scale. In some implementations a resource can be identified by a URI. Additionally or alternatively, in some implementations a resource can be identified by a service name specified by the customer 422.

A resource may be unambiguously identified based on the partition, service, region, account ID, and/or resource identifier, and the combination of service namespace, resource ID and scalable dimension may uniquely identify a scalable target. Among these pieces of information, the scaling service may only require the service and resource identifier (ID) from the customer 422. Using a combination of service namespace and resource ID may have advantages over using URIs. In one embodiment, the customer 422 describes the customer's resources registered in the scaling service 402 with reference to service namespace and resource ID or by service namespace only and, in this way, the customer 422 need not construct or keep track of URIs. Such an implementation would then accommodate resource services that do not use URIs.

In one embodiment, the customer 422 can specify a URI in the resource ID, and the system will assume that the service namespace is the one in the URI. In some implementations, alternative to or in addition to individual resource scaling, the scaling service 402 provides application scaling. "Application scaling" refers to scaling a group of related resources that form an application stack of the customer 422. For the purpose of scaling, the group of related resources, itself, would be a resource and would be uniquely identifiable. Therefore, the concepts of service namespace and resource ID also apply to application scaling.

However, if the customer 422 only intends to scale one resource, the scaling service need not have to know that it belongs to a group. On the other hand, if the intention is to scale the group as a whole, the customer 422 should consider scaling the group versus scaling the resources in it. It should be the job of the scaling service 402 to determine how to scale the resources. Regarding scalable dimensions, identifying the resource alone may not be sufficient to determine what dimension of the resource to scale. As noted above, the customer 422 may separately scale the read and write provisioned throughputs of a database service table. In general, a resource may have more than one scalable dimension that may be changed independently.

Therefore, in addition to service namespace and resource ID, the scaling service 402 may require the customer 422 to specify which "dimension" of a resource the customer 422 wants to scale. In one embodiment, a database service table, or global secondary index (GSI), may have read and write provisioned throughputs that may be changed independently and that may be regarded as scalable dimensions. For database service tables and GSIs, there may be at least two scalable dimensions for read and write provisioned throughputs, respectively. The customer 422 may define maximum and minimum boundaries and scaling policies per table/GSI and per scalable dimension.

Determination of whether to trigger a scaling policy and the scaling service 402 may be made by a source external to the scaling service 402, such as the telemetry service 406. That is, a scaling policy may be attached to a telemetry service alarm of the telemetry service 406 by the customer 422, and the scaling policy may be triggered by the telemetry service alarm. In one embodiment, the customer 422 could create a telemetry service alarm with the telemetry service 406 on any measurement being aggregated by the telemetry service (e.g., processor utilization). At the telemetry service 406, one or more thresholds may be specified for the telemetry service alarm; and the customer 422 may specify that the telemetry service alarm should fire when processor utilization reaches 50 percent utilization. Once the telemetry service alarm is set up, the customer 422 may attach any scaling policy to it, such that when the alarm fires (i.e., the measurement value exceeds the threshold), it may trigger the scaling policy.

The telemetry service 406 may call the scaling service 402 to invoke a scaling policy when an associated alarm enters a state that triggers the scaling policy. In some cases, the telemetry service 406 may periodically (e.g., every minute) invoke the scaling policy for as long as the alarm remains in that state. In one embodiment, the telemetry service 406 invokes a scaling policy only once per alarm state, and then a workflow may be performed after performing a scaling action to check the alarm state to determine if further scaling is needed.

As a result of the alarm firing, a notification of the alarm is sent to the scaling service frontend 414. The scaling service frontend 414 passes this information to the scaling service backend 418, which then fetches the corresponding scaling policy from the database service 410. The scaling service backend 418 examines the parameters in the retrieved scaling policy, obtains the current capacity of the resource to be scaled from the appropriate resource service, and performs the calculations specified by the scaling policy in view of the current capacity to determine that the new desired capacity for the resource needs to be scaled. Note that for some policy types, like a step policy, the scaling service 402 will get information about the metric in order to determine which steps in the scaling policy to apply to the resource. In one embodiment, the customer 422 may create a scaling policy for scaling up and down a resource based on a metric that is an indication of application load or traffic volume by setting up an alarm to trigger at certain thresholds of application load or traffic volume and attaching a policy to it. In one embodiment, triggering the alarm will invoke the policy so that when traffic volume goes up and down, the resource will be scaled as dictated by the scaling policy.

In one embodiment, the telemetry service 406 sends alarms in response to the occurrence of certain specified events (i.e., telemetry events). Such events include sending a message via a message queuing service or executing certain functions in a software container. Additionally or alternatively, in one embodiment, scaling policies can be triggered according to a predefined schedule. In one embodiment, the customer 422 may set a scaling schedule that triggers a scaling policy at 6:00 PM every day. Interruption of the telemetry service 406 may result in delayed scaling due to the delay in a telemetry service alarm being sent to the scaling service 402 to trigger execution of a scaling policy. Although metric-based alarms may be impacted due to unavailability of the telemetry service 406, on-demand (e.g., the customer 422 via the scaling service frontend 414) and scheduled scaling (e.g., command sent to the scaling service frontend 414 according to a schedule) would not be affected.

Upon receiving a call from the telemetry service 406 to invoke a scaling policy, the scaling service backend 418 may synchronously calculate the new desired capacity for the scalable target, and the scaling service workflow manager 420 may asynchronously set the desired capacity for the scalable target. The scaling service workflow manager 420 may contain workflow and activity definitions that are used when effecting and monitoring changes to the target service. Workflows may be launched by the scaling service workflow manager 420, which may utilize a control plane service to record, in the database service 410, interactions with the target service. Besides setting desired capacity, the scaling service workflow manager 420 may also record scaling activities. In one embodiment, the scaling service workflow manager 420 can also send notifications and/or publish events. The scaling service backend 418 may be responsible for starting workflow executions (e.g., via the workflow service 412). In one embodiment, a message queuing service is located between the scaling service backend 418 and the workflow service 412 for queuing workflow commands.

The database service 410 may be used to track the state of scaling activities, to store identities of scalable targets registered by the customer 422, and to store scaling policies defined by the customer 422. The scaling policies may be stored with the database service 410 in any applicable format, such as in a JavaScript Object Notation format in a table with the database service 410. However, the scaling policy may be automatically generated by the scaling service 402 so that the customer 422 need not directly provide the scaling policy. If the database service 410 has an outage, various methods may be performed to minimize adverse impact to the scaling service 402. In one embodiment, scalable targets and scaling policies may be cached; in this manner, new entities may not be created but the scaling service 402 will continue to automatically scale existing scalable targets. In one embodiment, recording of the scaling history may be made as a best effort; in other words, accuracy of the scaling history may be traded for availability, and "dangling" scaling activities may be closed. In one embodiment, the process of writing scaling tasks to the database service 410 may be bypassed. The scaling service backend 418 may put, in a queue of a message queuing service, a message for a scaling task that includes all of the data that the workflow service 412 needs in the message. Note that although FIG. 4 shows the database service 410 as residing external to the scaling service 402, it is contemplated that, in one embodiment, the functionality provided by the database service 410 may be found wholly or partially within the scaling service 402.

The resource services 404 may be services provided by a computing resource service provider hosting resources with scalable dimensions. If a resource service has a problem, scaling may be impacted as the scaling service 402 may be unable to get the current capacity of or update the resources of the resource service. In one embodiment, the resource service is able to continue accepting and queuing scaling requests even if the resource service is offline, although processing such requests may be impacted.

The customer 422 may execute a scaling policy in a variety of ways. In one embodiment, the customer 422 can execute the policy using a command line interface, a software development kit, or a console interface (e.g., accessible via a browser). In one embodiment, the customer 422 can have the policy invoked in response to receiving an alarm from the telemetry service 406. In one embodiment, the customer 422 can have the policy invoked by the occurrence of an event detected by the telemetry service 406. In one embodiment, the customer 422 can have the policy invoked according to a schedule specified to the telemetry service 406 by the customer 422.

Each scaling action (i.e., each change made to a resource's scalable dimension) may have associated metadata, such as a unique activity identifier (ID), resource URI, description, cause, start time, end time, and/or status. This associated metadata may be recorded/logged with the database service 410 in conjunction with each scaling action performed by the scaling service 402. The customer 422 may subsequently query the scaling activities of a particular resource service by its URI. Scaling actions may cause a telemetry service event to be published.

After each change to the scalable dimension (e.g., the desired task count of the service construct), the system may check the current alarm state to see if additional scaling is required. If the scaling policy is triggered manually by the customer 422, by the occurrence of an event or according to a schedule, rather than by an alarm of the telemetry service 406, the desired task count of the service construct may be changed based on the current running count and the scaling adjustment specified in the policy, within the minimum and maximum capacity. The scaling service 402 may apply the scaling adjustment specified in the policy to the current running count of the service construct.

The running count may be the actual processing capacity, as opposed to the desired task count, which is what the processing capacity is supposed to be. Calculating the new desired task count from the running count may prevent excessive scaling. If the scaling service 402 has increased the desired task count by 1, the alarm that triggered the scaling policy may still be active during the time that the task is being launched. However, once the new task is fully launched, the alarm may be deactivated, ensuring that the scaling service 402 does not scale-out further.

In one embodiment, scale-out is prioritized over scale-in; i.e., a scale-out will override an in-progress scale-in but not vice versa. In other embodiments, the reverse is true. An in-progress scale-in may be indicated by the running count being greater than the desired task count. In this situation, the scaling service 402 may allow a scale-out to increase the desired task count in a manner that optimally maintains application availability. Conversely, an in-progress scale-out may be indicated by the running count being less than the desired task count, in which case the scaling service 402 may not allow a scale-in to decrease the desired task count in order to optimally protect application availability.

The scaling service 402 may also utilize a timeout. The timeout may serve at least two purposes. First, the scaling service 402 may utilize a timeout in a check alarm state workflow in an event that a scaling action becomes stuck for an excessive (i.e., greater than a defined threshold) period of time; a service construct cluster that does not have enough capacity for new tasks may not respond to a demand to increase the number of tasks. In such an event, the alarm could remain in breach for a long time, and the timeout prevents the scaling service 402 from continually checking its state. Second, the scaling service 402 may prioritize scale-out/scale-up over scale-in/scale-down, but the scaling service 402 should not let a stuck scale-out/scale-up prevent a scale-in/scale-down from occurring. Thus, a timeout may allow the scaling service 402 to unblock the scale-in. Note that in some implementations, the timeout is user configurable; whereas in other implementations the timeout is a user non-configurable value which the scaling service 402 uses to determine whether to give up on a stuck scale-out.

The scaling service 402 is designed as a layer on top of the resource services 404 that calls into those services on behalf of the customer 422. This ensures that the scaling service 402 provides the customer 422 with a consistent automatic scaling experience for all resource services. The customer 422 may first create an alarm, or the customer may choose an existing alarm, in a console of the telemetry service 406 and then apply a scaling policy to the alarm.

One scaling policy type is a "step" policy, which allows the customer 422 to define multiple steps of scaling adjustments with respect to the measurement that triggers execution of the scaling policy. In one embodiment, the customer 422 may specify to scale-up a scalable dimension of the resource if processor utilization reaches certain threshold steps. In one embodiment, the customer 422 may specify to scale-up the scalable dimension of the resource by 10 percent if processor utilization is between 50 and 60 percent. The customer may further specify to scale-up the scalable dimension by 50 percent if processor utilization is between 60 and 70 percent, scale-up the scalable dimension by 30 percent if processor utilization is above 70 percent, and so on. In this manner the customer 422 can define multiple steps and/or multiple responses with different magnitudes with respect to the specified metrics.

The API of the scaling service 402 may be designed to operate as a separate service from the resource services 404 such that it is not integrated into any particular service of the resource services 404. In this manner, the scaling service 402 is not dependent upon any particular service of the resource services 404. In order to set up a particular resource service to be scaled by the scaling service 402, the scaling service 402 simply needs information about the APIs of the particular resource service to call in order to direct the particular resource service to scale-up or down. The scaling service 402 is able to maintain this independence by specifying which dimension of which resource of the particular resource service to scale and whether to scale-up or down; the logistics of how the particular resource should be scaled (e.g., which tasks to terminate, which container instances that do tasks should be launched, etc.) in response to direction from the scaling service 402 is determined by the particular resource service itself.

In one embodiment, additional components not pictured in FIG. 4 may be present within the scaling service 402. In one embodiment, a control plane service is present between the scaling service workflow manager 420 and external services such as the authentication service 416 and the database service 410. The control plane service may provide API operations for updating scaling history. Furthermore, having certain functions performed by the control plane instead of the scaling service backend 418 may mitigate performance impact if the scaling service backend 418 receives requests for many data retrieval operations from the customer 422. With a separate control plane, the effect on the scaling service 402 of the increased volume of retrieval operations is minimized. The control plane service may exist in addition to the backend service and may track and record all persistent service (e.g., database service 410, authentication service 416, etc.) interactions. In other embodiments, however, control plane functionality is integrated into the scaling service backend 418.

Also in one embodiment, service adapters are present within the scaling service 402 between the resource services 404 and certain scaling service components, such as the scaling service backend 418 and the scaling service workflow manager 420. The service adapters may be responsible for routing the scaling request through appropriate APIs for the target service. In alternative embodiments, the service adapter functionality is present within the scaling service workflow manager 420 and/or the scaling service backend 418. However, because the scaling service 402 is decoupled from the resource services 404, the scaling service 402 relies on a response from the particular resource service in order to determine whether a scaling request has been fulfilled.

The workflow service 412 may be a collection of computing devices and other resources collectively configured to perform task coordination and management services that enable executing computing tasks across a plurality of computing environments and platforms. The workflow service 412 may provide a workflow engine used to effect asynchronous changes in the scaling service 402. The workflow service 412 may be used to update target resources and may also be used as a lock to control concurrent scaling requests. The workflow service 412 may track the progress of workflow execution and perform the dispatching and holding of tasks. Further, the workflow service 412 may control the assignment of hosts or physical or virtual computing machines used for executing the tasks. In one embodiment, a user may define a workflow for execution such that the workflow includes one or more tasks using an API function call to the workflow service 412. Further, the user may specify task order for the workflow, conditional flows, and timeout periods for restarting or terminating the execution of the workflow. In addition, execution loops for the workflow may be defined. Workflow execution may be asynchronous and may be preceded by synchronous execution of database writes. Note that although FIG. 4 shows the workflow service 412 as residing external to the scaling service 402, it is contemplated that, in one embodiment, the functionality provided by the workflow service 412 may be found wholly or partially within the scaling service 402.

Interruption of the workflow service 412 may cause delayed scaling because the asynchronous processing of scaling requests may be adversely impacted. One way to mitigate delayed scaling may be to do only what is absolutely required to scale synchronously via the scaling service frontend 414. At a minimum, the scaling service may attempt to set desired capacity and record scaling history. From a performance standpoint, this may be acceptable because it just requires an API call to the resource service owning the resource to be scaled and a minimum of extra writes to the database service 410. Although this may result in losing features of workflow service 412 (e.g., retry mechanism, history tracking, etc.), at least the system will perform the operations that are required to scale.

The scalable targets (i.e., scalable resources) may reside with the resource service 404 (e.g., in a warm or ready pool). A scalable target may be uniquely identified from the triple combination of service (e.g., service namespace), resource (e.g., resource ID), and scalable dimension. The resource services 404 represent the services that actually manage the resources that the customer 422 wants to be automatically scaled. In this manner, the scaling service 402 exists as a separate service from the resource services 404 whose resources are caused to be scaled by the scaling service 402.

The resource services 404, as noted, may include services such as a software container service, a database service, a streaming service, and so on. The scaling service 402 may take the scaling policies created by the customer 422 and, when the scaling policies are invoked (e.g., by an alarm from the telemetry service 406), the scaling service 402 may perform the calculations to determine, given the particular policy and the current capacity of the resource, whether to increase or decrease the capacity to a new value. In order to get the current capacity of the resource, the scaling service backend 418 may make a service call to the resource service 404 of the resource to be scaled. In response, the resource service 404 may provide the scaling service 402 with the current capacity (e.g., "five tasks").

The scaling service workflow manager 420 may then make a service call to the resource service 404 that actually owns the resource to be scaled to cause the scaling action to be performed. In other words, because the scaling service 402 is a separate service from the resource service 404 that hosts the resources, the scaling service 402 will make service calls to the resource service that owns the resource in order to get the state of the resource and also to change the state of the resource.

The authentication service 416 may be a service used for authenticating users and other entities (e.g., other services). In one embodiment, when a customer of a computing resource service provider interacts with an API of the computing resource service provider, the computing resource service provider queries the authentication service 416 to determine whether the customer is authorized to have the API request fulfilled. In the process of creating a scaling policy, the customer 422 may assign the scaling service 402 to a role that authorizes fulfillment of certain requests, and the scaling service 402 may then assume that role in order to make appropriate requests to cause a resource service associated with the policy to scale resources. In this manner, the role (supported by a role management service) gives the scaling service 402 the necessary permission to access the resource that lives in the resource services 404.

The customer 422 may create a role supported by a role management service through an interface console. The interface console may allow the customer 422 to click an appropriate button or consent checkbox in the interface console, and the underlying system may create the role with the necessary permissions. The token service 408 may provide the scaling service 402 with session credentials based on a role or roles specified by the customer 422. These session credentials may be used by the scaling service 402 to interact with the resource services 404 on behalf of the customer 422. The token service 408 may provide a token to the scaling service 402 that the scaling service may include with requests that provide evidence that the scaling service 402 has been granted the appropriate role to cause scalable dimensions of a resource in the resource services 404 to be manipulated. The role may be utilized by the automatic scaling service to call a resource service's APIs on behalf of the customer 422.

Interruption of the token service 408 may result in the scaling service 402 being unable to assume a role supported by a role management service, with the scaling service 402 thereby being unable to scale a resource of the customer 422. In one embodiment, the scaling service 402 caches temporary credentials (e.g., they may be valid for 15 minutes, etc.) that the scaling service 402 can use when assuming a role.

As described in the present disclosure, the scaling service 402, itself, does not determine whether conditions that trigger a scaling policy are met. Rather, an external entity, such as the telemetry service 406, determines whether conditions have been met (e.g., by an alarm specified by the customer 422) and, if met, sends a notification to the scaling service 402 that triggers execution of the appropriate scaling policy. Thus, a scaling policy may be triggered by an alarm sent by this telemetry service 406, by the occurrence of an event that triggers notification from an external entity, on demand by the customer 422, according to a notification that is sent to the scaling service 402 according to a schedule, or by some other external notification.

As noted, in one embodiment, the scaling service supports application scaling. In addition to the foregoing, "application scaling" refers to a grouped set of resources from different services (e.g., comprising an application of the customer, such as a virtual machine from a virtual computer system service and a database from a database service). Through the scaling service interface, the customer 422 may group different resources together under a common name for scaling. In one embodiment, if the customer 422 has resources that use a database service, virtual computing system service, load balancing service, and a streaming service, the customer 422 may use a group scaling policy to scale-up or scale-down scalable dimensions of the resource of the group based on a particular trigger (e.g., alarm of the telemetry service 406). Based at least in part on the policy, the scaling service 402 knows which scaling commands to send to which service. In this manner, the customer can group together some or all of the customer's services/resources and perform scaling for that group of services as opposed to scaling resources individually. In one embodiment, a scaling policy triggered by a telemetry service alarm may specify to increase the group by three more database service instances, 10 more virtual machines, and four load balancers.

Additionally or alternatively, in one embodiment the scaling service 402 supports "target tracking metrics." In one embodiment, "target tracking metrics" refers to measurements that the customer 422 wants to keep within a specific range. This simplifies the user experience because the customer 422 simply specifies the metric of a resource and the particular range, and the scaling service 402 determines how to scale the resource to keep the measurements within the particular range. In one embodiment, if the scalable dimension is processor utilization and the customer specifies to keep the scalable dimension between 40 and 60 percent, the scaling service 402 determines how to keep the measurements within this range. Consequently, the customer is spared having to define within a first range to scale-up by a first amount, within a second range to scale-up by a second amount, and so on.

Figure 5:
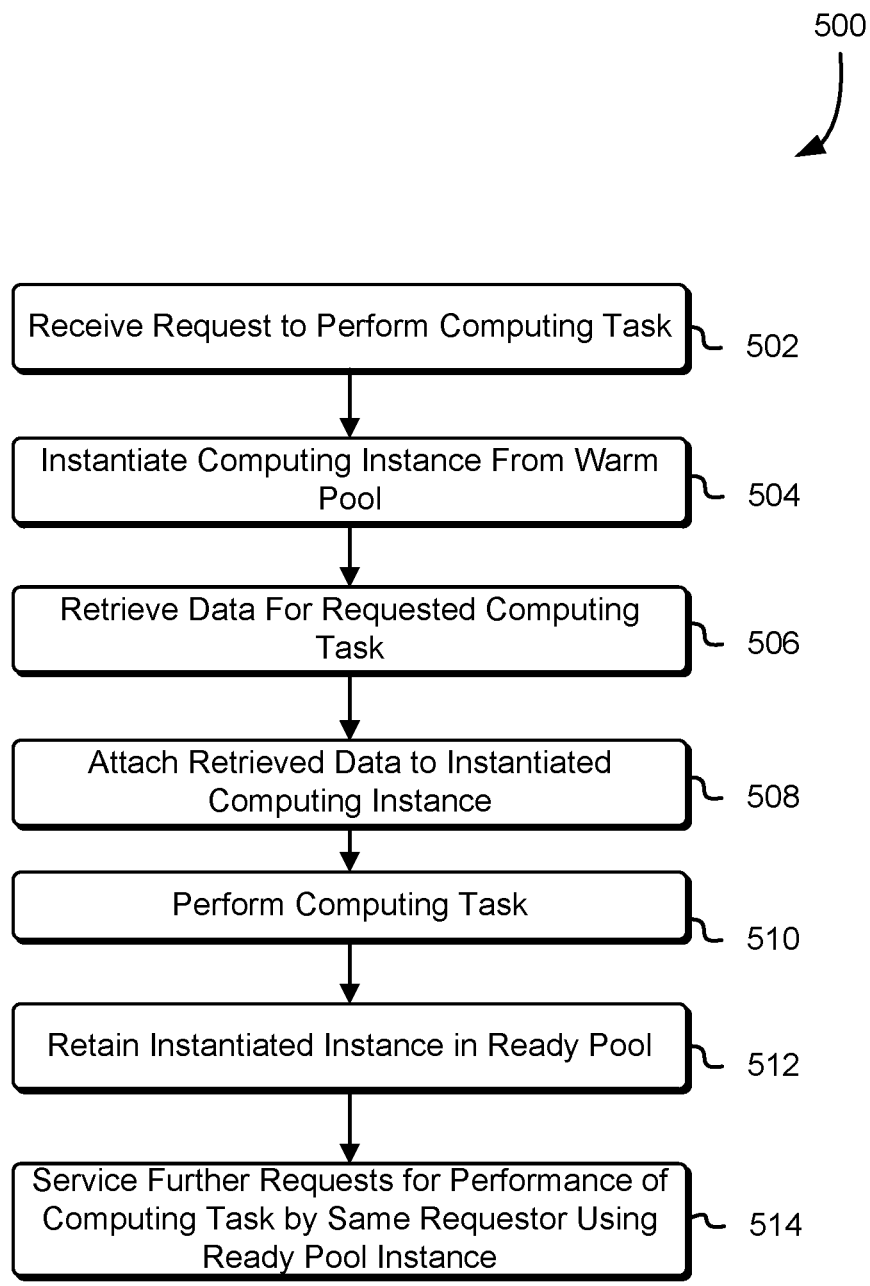
FIG. 5 illustrates an example process for holding computing resources in a ready pool in connection with computing tasks, in accordance with one embodiment.

FIG. 5 illustrates an example process for holding computing resources in a ready pool in connection with computing tasks, in accordance with one embodiment.

At step 502, a system, such as a resource service of a computing resource service provider, receives a request to perform a computing task. As mentioned, the request may be programmatic (e.g., via an API or webservice call), through a user interface, or by some combination thereof, and the computing task may involve additional data and/or applications beyond that which is ordinarily provided by a base image implemented by the resource service.

At step 504, the scaling service or similar entity of the computing resource service provider selects a computing instance running in a warm pool implemented by, e.g., the resource service and scaling service previously described. As mentioned, in one embodiment, if no suitable instance (e.g., by virtue of the instance not having sufficient resources available to it to perform the requested task), a new instance may be instantiated from an image, rather than being pulled from the warm pool.

To the extent that the requested computing task requires additional data, applications, resources, etc. beyond that which is provided by the instance provided in step 504, the additional data is retrieved (e.g., from the requestor, or on behalf of the requestor from an external service or other resource) and attached to the instance at steps 506 and 508, respectively. After the instance is prepared for execution of the requested task per steps 506 and 508, the requested task is performed at step 510, and after execution of the task, the instance is attached to a ready pool at step 512. The length of time between when the task completes and when the associated instance is attached to the ready pool may be either a fixed value, or adaptive.

At step 514, any further requests for performance of the computing task from the requestor is served using the ready pool instance (e.g., of step 512). In one embodiment, the ready pool instance may be held in the ready pool for an indefinite amount of time after the last task execution for that instance. In other embodiments, the pool instance is held for a fixed amount of time after any given task has been completed before it is expunged. In another embodiment, the pool instance is held for a fixed amount of time after it is attached regardless of whether or not any task is executing, after which it is expunged from the pool. In yet another embodiment, the pool instance is held for a fixed amount of time after it is attached, but if the time expires during task execution, the instance is retained in the pool until the task is complete (or until a secondary period of time elapses, e.g., so as to account for indefinitely hung tasks).

Figure 6:
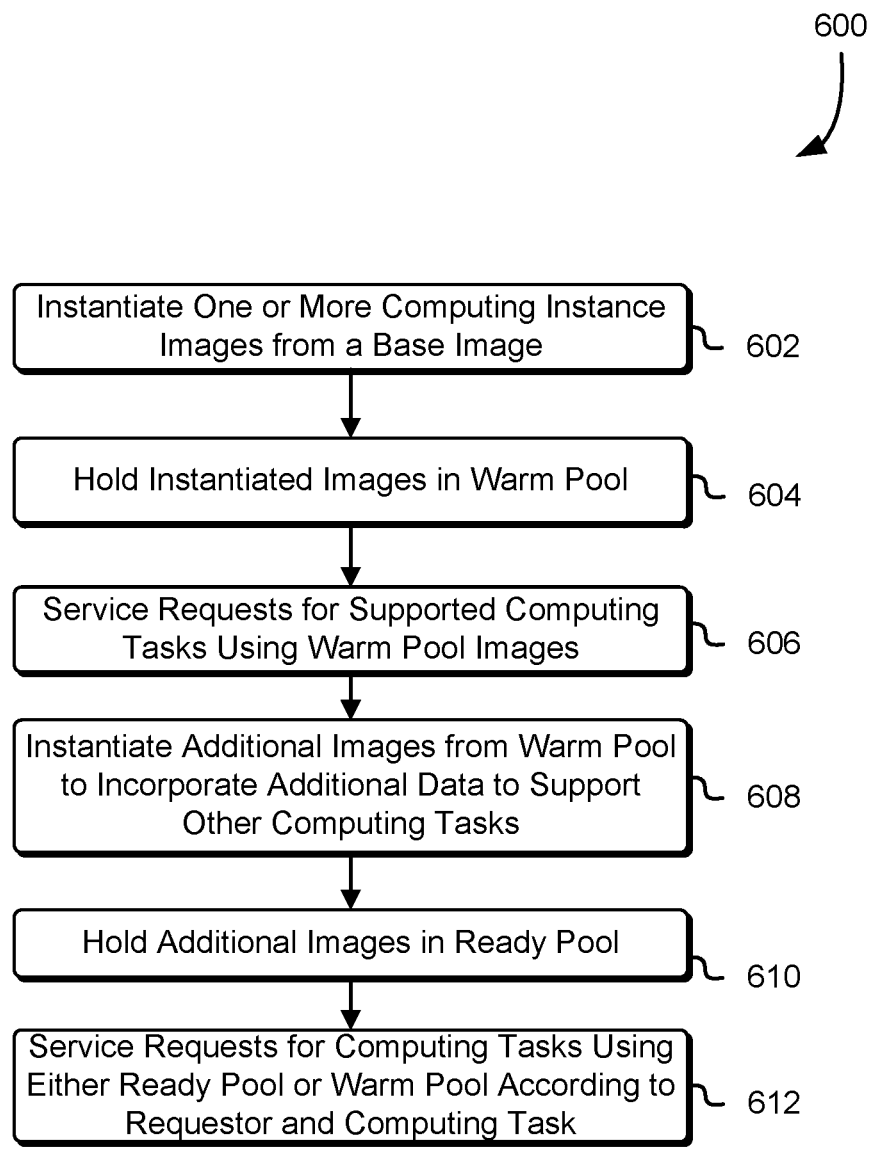
FIG. 6 illustrates an example process for utilizing a ready pool in connection with fulfilling requests for performance of computing tasks, in accordance with one embodiment.

FIG. 6 illustrates an example process for utilizing a ready pool in connection with fulfilling requests for performance of computing tasks, in accordance with one embodiment.

At step 602, a resource service or other component of a computing resource service provider instantiates one or more computing instances from a base image, using techniques previously described, and in a quantity and manner in accordance with one or more scaling policies and/or decisions of, e.g., a scaling service as previously described. The instantiated images are held in a warm pool at step 604, and at step 606, computing tasks are fulfilled out of the warm pool when, e.g., instance types and other parameters indicate that the instances can be matched with the requested tasks.

At step 608, to the extent that incoming tasks are associated with tasks that require other data or applications beyond that which is provided by the warm pool instances (e.g., extant within the base image from which they derive), the additional data is attached to the associated instances for those tasks so as to support the performance of the requested tasks. At step 610, these instances are attached to a ready pool for each of the respective requestors, so long as such instances are not restricted from being attached thereby (e.g., according to policies, system limitations, and the like previously discussed elsewhere herein).

To the extent that additional requests for computing tasks associated with steps 608 and 610 are received from requestors on behalf of whom the ready pool(s) are maintained, applicable instances from those ready pools are used to execute the computing tasks in accordance with the additional requests at step 612. It should be noted that if a given task may be performed by both an instance available in the ready pool and one available in the warm pool, the system may select the warm pool instance over the ready pool instance even if, ordinarily, the system has an affinity for ready pool instances, for, e.g., load balancing purposes.

Similarly, if a ready pool instance is capable of performing a type of task that a ready pool instance is not, if a requestor submits a request to perform a task that both instances are capable of executing, the system may favor the ready pool instance even if the task for which that instance was added to the ready is not the task requested by the requestor.

Figure 7:
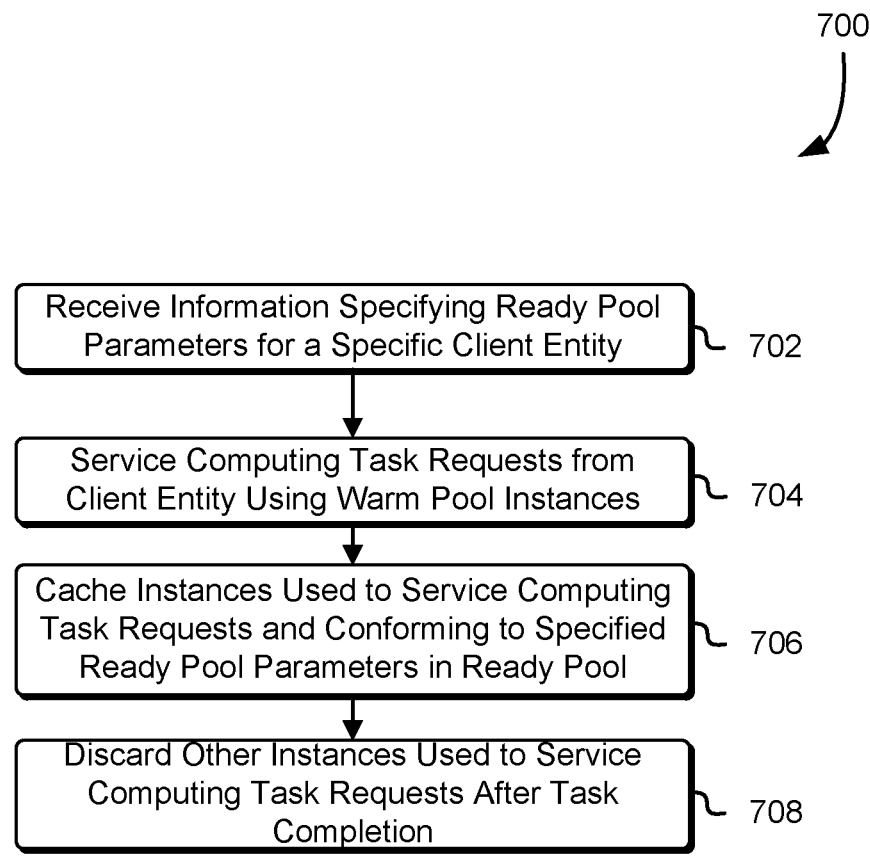
FIG. 7 illustrates an example process for processing requestor-defined isolation boundaries to determine the boundaries of a ready pool, in accordance with one embodiment.

FIG. 7 illustrates an example process for processing requestor-defined isolation boundaries to determine the boundaries of a ready pool, in accordance with one embodiment.

At step 702, the computing resource service provider, via, e.g., a front end of a scaling service, receives information specifying one or more boundaries or other parameters associated with a ready pool for the associated requestor (e.g., client or customer entity/device). As previously discussed, this information may be in the form of a policy update, as part of a request to perform a computing task, etc.

At step 704, in a fashion similar to that which is described in FIGS. 5 and 6 above, computing task requests from requestors are serviced using instances spun up in the warm pool. At step 706, if instances are eligible for addition to the requestor's ready pool per the information (parameters) defined in step 702, they are added to the requestor's ready pool for exclusive usage by that requestor. At step 708, other instances (e.g., those which are ineligible for one reason or another) are simply discarded after execution of the specific task for which they are instantiated, and cannot be accessed by that requestor or any others once they have been destroyed.

Figure 8:
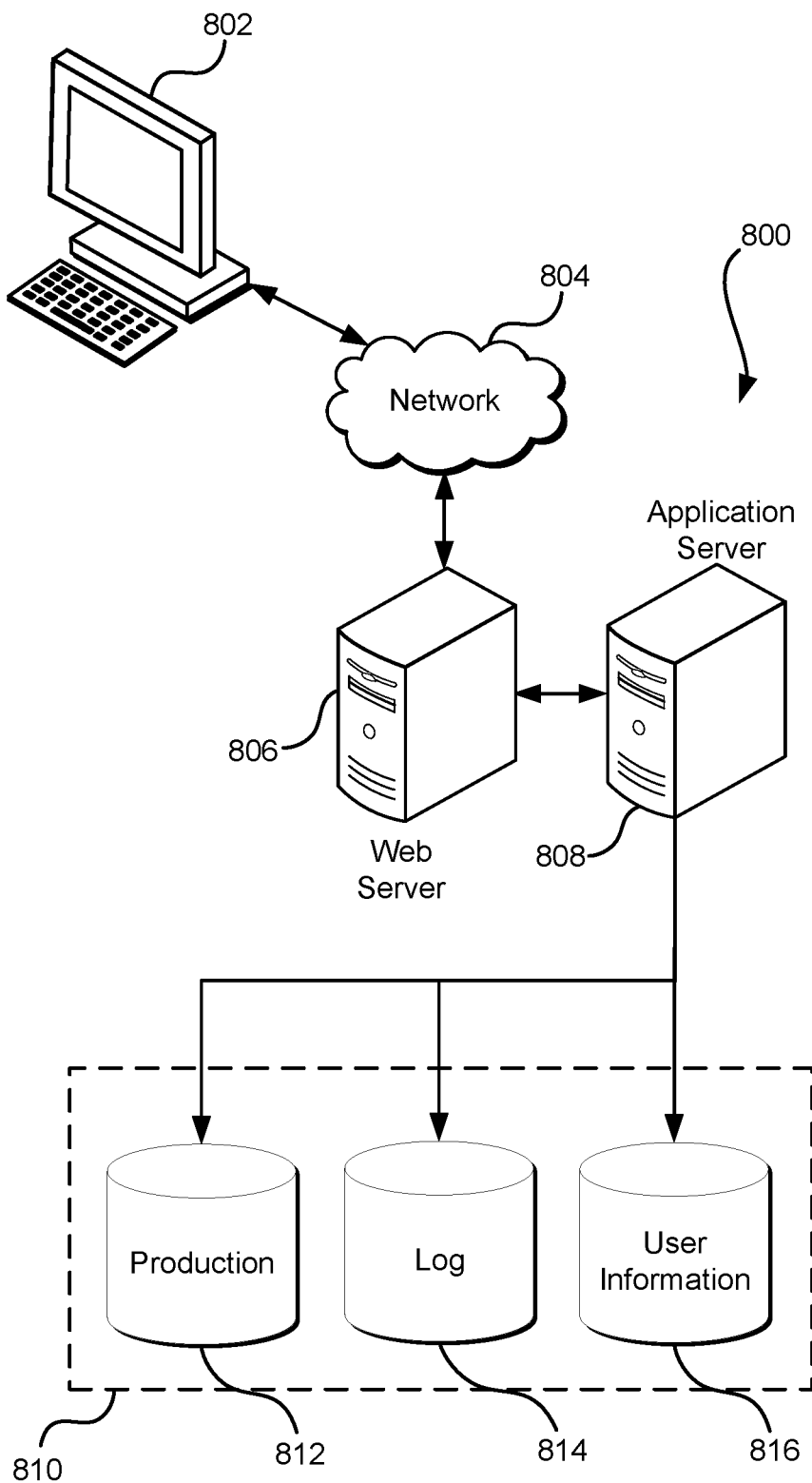
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In one embodiment, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a plurality of computing instances from a base image, the base image including a first set of data associated with execution of a first computing task, the plurality of computing instances including the first set of data such that, when a given instance of the plurality of computing instances is instantiated, the given instance executes instructions from code to perform the first computing task;
    caching the plurality of computing instances in a first pool, the first pool being available to a plurality of requestors;
    receiving a first request from a requestor of the plurality of requestors to execute a second computing task, wherein the second computing task relies on a second set of data, obtained from a data container provided in the first request, comprising data that is unavailable in the base image;
    retrieving, from the first pool, a first computing instance of the plurality of computing instances;
    adding the second set of data to the first computing instance thereby generating a second computing instance;
    instantiating the second computing instance to execute instructions from code to perform the second computing task;
    caching the second computing instance in a second pool, wherein the second pool includes computing instances with access to data related to performing the second computing task and being available to the requestor and unavailable to a remainder of the plurality of requestors;
    receiving a second request from the requestor to execute the second computing task; and
    using the second computing instance from the second pool to execute the instructions from code to perform the second computing task.

2. The computer-implemented method of claim 1, wherein the first request includes one or more parameters associated with creation of the second pool.

3. The computer-implemented method of claim 2, wherein the one or more parameters includes an instruction to exclude at least some of the remainder of the plurality of requestors.

4. The computer-implemented method of claim 1, wherein the second set of data includes one or more applications executable on the second computing instance.

5. A system, comprising:
    one or more processors; and
    memory including executable instructions that, as a result of being executed by the one or more processors, cause the system to at least:
        associate a first set of computing instances to perform a first computing task;
        associate a second set of computing instances to perform a second computing task by adding data to the first set of computing instances, the second set of computing instances being instantiated with the added data in response to a request to perform the second computing task, wherein the added data, obtained from a data container provided in the request, comprises data that is unavailable in the first set of computing instances;
        process a request to perform the first computing task using the first set of computing instances or the second set of computing instances; and
        process a request to perform the second computing task using the second set of computing instances having access to data related to performing the second computing task, wherein the second computing task involves use of the added data.

6. The system of claim 5, wherein the executable instructions that cause the system to associate the first set of computing instances further includes executable instructions that, as a result of being executed by the one or more processors, cause the system to generate the first set of computing instances from a base image and data sufficient for the first set of computing instances to perform the first computing task.

7. The system of claim 6, wherein one or more applications associated with the first computing task are included in the base image, and the data is input data for the one or more applications.

8. The system of claim 5, wherein the executable instructions that cause the system to associate the second set of computing instances further includes executable instructions that, as a result of being executed by the one or more processors, cause the system to generate the second set of computing instances from the first set of computing instances using the added data sufficient for the second set of computing instances to perform the second computing task.

9. The system of claim 8, wherein the added data is to be obtained from a data container provided by a requestor.

10. The system of claim 5, wherein the executable instructions that cause the system to associate the first set of computing instances further includes executable instructions that, as a result of being executed by the one or more processors, cause the system to determine the first set of computing instances based at least in part on historical requests to perform the first computing task.

11. The system of claim 5, wherein the second set of computing instances is associated according to a capability common to the second set of computing instances and associated with the second computing task.

12. The system of claim 5, wherein the first set of computing instances is associated with a datacenter of the system.

13. A non-transitory computer-readable storage medium having stored thereon executable instructions that, as a result of being executed by one or more processors of a computer system, cause the computer system to at least:
    for each requestor of a plurality of requestors, associate:
        a first set of computing instances to perform a first computing task; and
        a second set of computing instances to perform a second computing task by adding data to the first set of computing instances, wherein the added data, obtained from a data container, comprises data that is unavailable in the first set of computing instances; and process requests using the first set of computing instances or the second set of computing instances according to an identity of a respective requestor of the plurality of requestors and parameters associated with the requests, wherein the second set of computing instances is provided with access to the added data and data from executing the second computing task.

14. The non-transitory computer-readable storage medium of claim 13, wherein the instructions further comprise instructions that, as a result of being executed by the one or more processors, cause the computer system to associate the second set of computing instances in response to a plurality of requests from a respective requestor of the plurality of requestors to perform the second computing task.

15. The non-transitory computer-readable storage medium of claim 13, wherein the first computing task is an execution of an application.

16. The non-transitory computer-readable storage medium of claim 15, wherein the second computing task includes processing a static dataset using the application.

17. The non-transitory computer-readable storage medium of claim 13, wherein access to the second computing task is restricted to a subset of the plurality of requestors.

18. The non-transitory computer-readable storage medium of claim 13, wherein the instructions further comprise instructions that, as a result of being executed by the one or more processors, cause the computer system to exclude from the second set of computing instances any iteration of the second computing task where the requestor specifies that the second computing task is not to be repeated.

19. The non-transitory computer-readable storage medium of claim 13, wherein the instructions further comprise instructions that, as a result of being executed by the one or more processors, cause the computer system to periodically update the second set of computing instances.

20. The non-transitory computer-readable storage medium of claim 13, wherein the instructions further comprise instructions that, as a result of being executed by the one or more processors, cause the computer system to evict one or more computing instances from the second set of computing instances a predetermined period of time after the second computing task is performed.

* * * * *